E. H. CLINTON.
Harvester-Rakes.

No. 151,846.

2 Sheets--Sheet 1.

Patented June 9, 1874.

Witnesses:
James Martin Jr.
J. N. Campbell

Inventor:
Edward H. Clinton
by Mason, Fenwick & Lawrence

2 Sheets--Sheet 2.

E. H. CLINTON.
Harvester-Rakes.

No. 151,846. Patented June 9, 1874.

Witnesses.
James Martin Jr.
J. N. Campbell.

Inventor.
Edward H. Clinton
by
Mason, Fenwick & Lawrence

UNITED STATES PATENT OFFICE.

EDWARD H. CLINTON, OF IOWA CITY, IOWA.

IMPROVEMENT IN HARVESTER-RAKES.

Specification forming part of Letters Patent No. 151,846, dated June 9, 1874; application filed December 2, 1873.

*To all whom it may concern:*

Be it known that I, EDWARD H. CLINTON, of Iowa City, in the county of Johnson and State of Iowa, have invented a new and useful Improvement in Harvester-Rakes; and I do hereby declare that the following is a full, clear, and exact description thereof, reference being had to the accompanying drawings, making part of this specification, in which—

Figure 1:
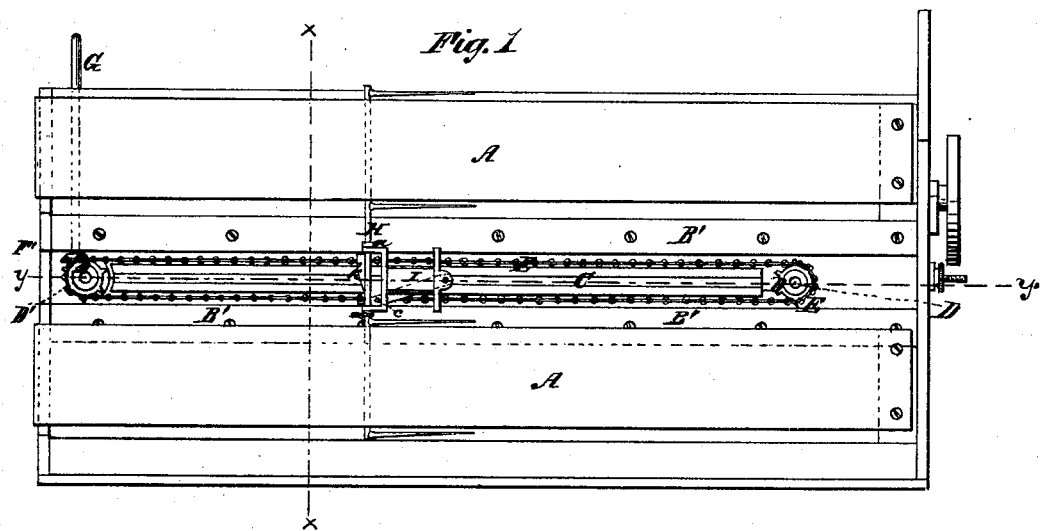
Figure 2:
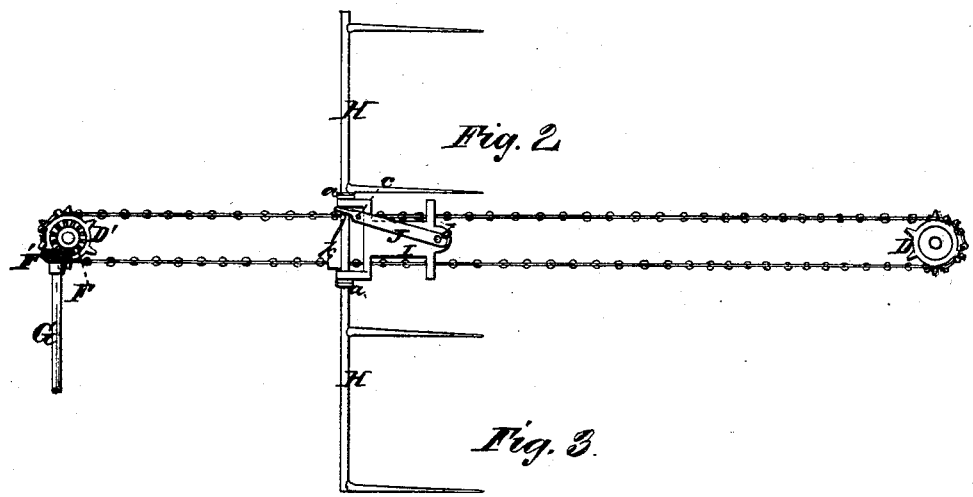
Figure 3:
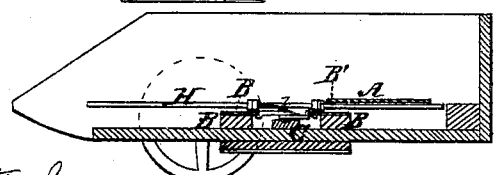
Figure 4:
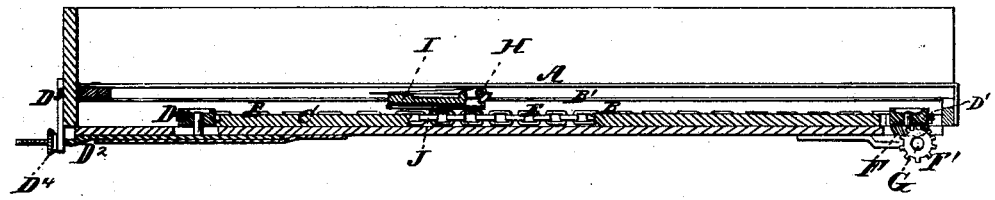
Figure 5:
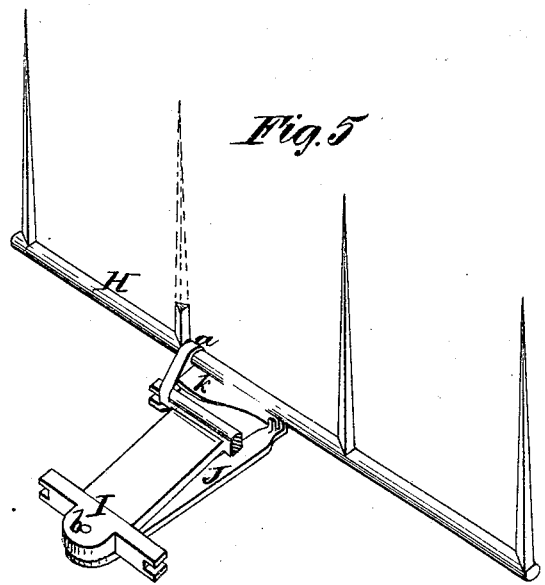

Figure 1 is a plan view of the rake applied to a side-delivery platform. Fig. 2 is an inverted plan of the rake, chain for carrying it, and pulleys upon which the chain revolves. Fig. 3 is a transverse section in the line $x\,x$ of Fig. 1. Fig. 4 is a longitudinal section in the line $y\,y$ of Fig. 1. Fig 5 is an enlarged view of the rake-head and the combined spiral vane and lever, for turning the teeth of said head up and down at the respective ends of the platform.

The same letters of reference in the several figures indicate corresponding parts.

The nature of my invention consists in the combination, with the rake and the carrying chain, of a pivoted vibrating lever and a spiral vane or feather, the lever being forked at its loose end, and connected to the chain and to the guide of the rake, and by said forked end geared with the spiral vane or feather, which is on the rake-head. By this combination the rake is reciprocated or carried back and forth over the harvester-platform, and at the commencement of its movement its teeth are raised to a vertical position and kept so until it completes its movement to the delivery end of the platform, when its teeth are depressed below the plane of the top of the platform, and its direction of movement reversed, and it is carried back to the starting-point. It consists, second, in a rake which has its teeth turned down and up by means of a vibrating lever, and a spiral vane operating in combination with one another. This construction greatly simplifies the mechanism heretofore required for turning the teeth of harvester-rakes up and down. It consists, third, in teeth of a harvester-rake made sharp on their back edge, so that when turned down into the slots of the slatted platform they shall be capable of cutting their way through sticks or any obstruction which may by chance lie across the slots upon the platform.

The following description of my invention will enable others skilled in the art to make and use it.

A is a slatted platform; B B, two guiding-rails with guiding-plates on their top, running from end to end thereof. C is a central strip placed between the chain-pulleys, for keeping the chain straight. D D$^1$ are the chain-pulleys, made with sprocket-teeth, and E is the endless chain which carries the rake. The pulleys have their shafts vertical, and the chain therefore runs with the edge of its links parallel with the platform. The shaft of the pulley D$^1$ is furnished with a bevel-wheel, F, and this wheel gears with another bevel-wheel, F', on a shaft, G. The shaft G will, in practice, be set in motion by intermediate gearing, actuated by the traction-wheel of a harvester. The shaft of pulley D is seated in a sliding support, D$^2$, the outer end of which terminates in a screw-threaded stem, which passes through a bracket, D$^3$, and receives upon its screw-threaded portion an adjusting-nut, D$^4$. By this arrangement of the pulley D it can be moved in or out, and thus the chain can be adjusted and kept to the proper tension, it being simply necessary to turn the nut to produce the desired tension. H is a rake. It consists of a vibrating shaft with teeth set rigidly in it. This shaft is connected to the horizontally-sliding guide I by means of eye-bearings $a\,a$ of said guide. The guide, as usual, is grooved on its edges, and is fitted to the guide-plates B' of the rails, so as to not be able to move up and down to any great extent. It, however, is free to slide back and forth in these guides. To the under side of this guide a lever, J, is pivoted at $b$. This lever is also pivoted to the upper edge of the chain E at $c$. Beyond the pivot $c$ the lever extends a short distance, and terminates with a forked end—the prongs being at right angles, or nearly so, to the face of the lever. On the rake-head a spiral feather or vane, K, equal in length about to the space between the guide-rail is applied, and the prongs of the end of the lever receive this vane between them, as shown.

It will be evident that as the chain revolves around its pulleys it carries that end of the lever which is pivoted to it entirely around the axes of the pulleys, and that consequently at one end of the platform the forked lever will move to the right, and by wedging contact with the vane will cause the teeth to change the position they occupy, and when the lever arrives at the other end of the platform the end which is pivoted to the chain will be carried entirely around the axis of the pulley at said end, and thus caused to move to the left, and in moving to the left, will, by wedging contact with the spiral vane, cause the rake-teeth to change the position they occupied when they first started in the movement. The effect of the changes will be to raise the teeth for raking off the grain, and to lower them beneath the platform on the return movement.

The combination between the spiral vane and forked lever is such that the vane serves to hold the rake-teeth elevated or depressed, until it is desired that a change in position shall take place. The teeth are made three-sided, and their back edge is sharp like a sickle, in order that, in descending in the return movement, they shall cut their way through any sticks or obstructions on the platform.

I contemplate applying my invention to different styles of platforms or harvesters in use, either to front or rear cut, or side and rear delivery machines.

What I claim as my invention, and desire to secure by Letters Patent, is—

1. The spiral vane upon the rake-head, in combination with the vibrating lever which gears with it, substantially as and for the purpose described.

2. The combination, with the rake and carrying chain, of the vibrating lever and the spiral vane, substantially as described, and for the purpose set forth.

3. The combination of the teeth, of a reciprocating grain-rake made with a cutting edge, with the slotted platform, substantially as and for the purpose described.

EDWARD H. CLINTON.

Witnesses:
JAS. B. EDWARDS,
HARVEY W. FYFFE.